(12) United States Patent
Krus

(10) Patent No.: US 11,123,745 B2
(45) Date of Patent: Sep. 21, 2021

(54) MINCER

(71) Applicant: Lifetime Brands, Inc., Garden City, NY (US)

(72) Inventor: Matthew Krus, Seattle, WA (US)

(73) Assignee: Lifetime Brands, Inc., Garden City, NY (US)

( * ) Notice: Subject to any disclaimer, the term of this patent is extended or adjusted under 35 U.S.C. 154(b) by 326 days.

(21) Appl. No.: 16/394,549

(22) Filed: Apr. 25, 2019

(65) Prior Publication Data

US 2019/0329264 A1 Oct. 31, 2019

Related U.S. Application Data

(60) Provisional application No. 62/663,099, filed on Apr. 26, 2018.

(51) Int. Cl.
*B02C 18/18* (2006.01)
*B26B 25/00* (2006.01)

(52) U.S. Cl.
CPC .......... *B02C 18/182* (2013.01); *B26B 25/005* (2013.01)

(58) Field of Classification Search
CPC .. A47J 42/22; A47J 42/24; A47J 42/28; A47J 42/32; A47J 42/34; B02C 18/182; B26B 25/00; B26B 25/002; B26B 25/005; B26B 25/007; B26B 27/00
USPC ....... 241/168, 169, 169.1, 199, 286; 30/101, 30/102, 292, 306, 307, 319
See application file for complete search history.

(56) References Cited

U.S. PATENT DOCUMENTS

| | | | |
|---|---|---|---|
| 5,355,588 A * | 10/1994 | Brandenburg, Jr. | .... B26B 29/02 30/292 |
| 5,960,709 A | 10/1999 | Yip | |
| D423,317 S * | 4/2000 | Takeshita | ............... B26D 1/205 D8/51 |
| 6,113,016 A | 9/2000 | Vedefors | |
| 6,438,850 B2 * | 8/2002 | Young | .................. B26B 25/005 30/162 |
| 7,040,208 B2 * | 5/2006 | Mori | .................... B23D 35/008 83/563 |
| 2007/0028463 A1 * | 2/2007 | Chan | ...................... B26D 1/205 30/319 |
| 2007/0294898 A1 * | 12/2007 | Beltran | ................. B26B 25/005 30/307 |
| 2010/0263217 A1 * | 10/2010 | Baxter | .................. B26B 25/005 30/287 |
| 2016/0051990 A1 | 2/2016 | Joechner | |

(Continued)

OTHER PUBLICATIONS

International Search Report from PCT/US2019/29104 dated Sep. 17, 2019, 3 pgs.

*Primary Examiner* — Edward T Tolan
*Assistant Examiner* — Jared O Brown
(74) *Attorney, Agent, or Firm* — Tutunjian & Bitetto, P.C.

(57) ABSTRACT

A mincer includes a housing, a hinged door, a handle, a cam, an axle, and a plurality of circular blades mounted on the axle. Rotation of the handle or knob with respect to the housing causes rotation of the cam with respect to the housing, which in turn causes the axle and the blades mounted thereon to travel radially outward or inward with respect to the housing to extend or retract the blades out of or into the housing. The mincer can be operated to extend the blades for operation and to retract the blades for storage. The door can be closed for operation and opened for cleaning of the mincer.

11 Claims, 7 Drawing Sheets

(56) References Cited

U.S. PATENT DOCUMENTS

2017/0106376 A1  4/2017  Quadrana
2017/0210024 A1  7/2017  Mascari

* cited by examiner

MINCER

BACKGROUND

Technical Field

The present disclosure is directed generally to mincers, and more particularly to mincers having rolling blades to quickly mince edible items.

Description of the Related Art

A wide variety of mincers are currently commercially available. Many mincers are provided with a plurality of rolling blades that allow a user to quickly mince edible items. These mincers often mount the rolling blades within a housing, with a portion of the blades exposed from the housing to allow them to engage with the items to be minced. Thus, these mincers are often also provided with a cap or cover that can be coupled to the housing to enclose the portion of the blades external to the housing for safety when the mincer is not in use, such as during storage, and that can be removed from the housing to expose the blades for use. Such caps or cover components add complexity, require cleaning, and may break or be lost over time.

BRIEF SUMMARY

A mincer may be summarized as comprising: a first plate including a first linear slot that extends linearly through the first plate; a second plate including a first arcuate slot that extends along a first arcuate path through the second plate; an axle that extends through the first linear slot and through the first arcuate slot such that rotation of the second plate with respect to the first plate causes the axle to move through the first linear slot and linearly with respect to the first plate; and a circular blade mounted on the axle.

The first arcuate path of the second plate may extend from a first location proximate a center of the second plate to a second location proximate an outer peripheral edge of the second plate. The first arcuate slot may extend along a path forming a portion of a circle. The circle may have a center offset from a center of the second plate. The first plate may be a cylindrical plate and the second plate may be a cam plate. The mincer may further comprise: a third plate including a second linear slot that extends linearly through the third plate, the third plate rigidly coupled to and aligned with the first plate; and a fourth plate including a second arcuate slot that extends along a second arcuate path through the fourth plate, the fourth plate rigidly coupled to and aligned with the second plate; wherein the axle extends through the second linear slot and through the second arcuate slot.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with the technology have not been shown or described in detail to avoid unnecessarily obscuring descriptions of the implementations.

Figure 1:
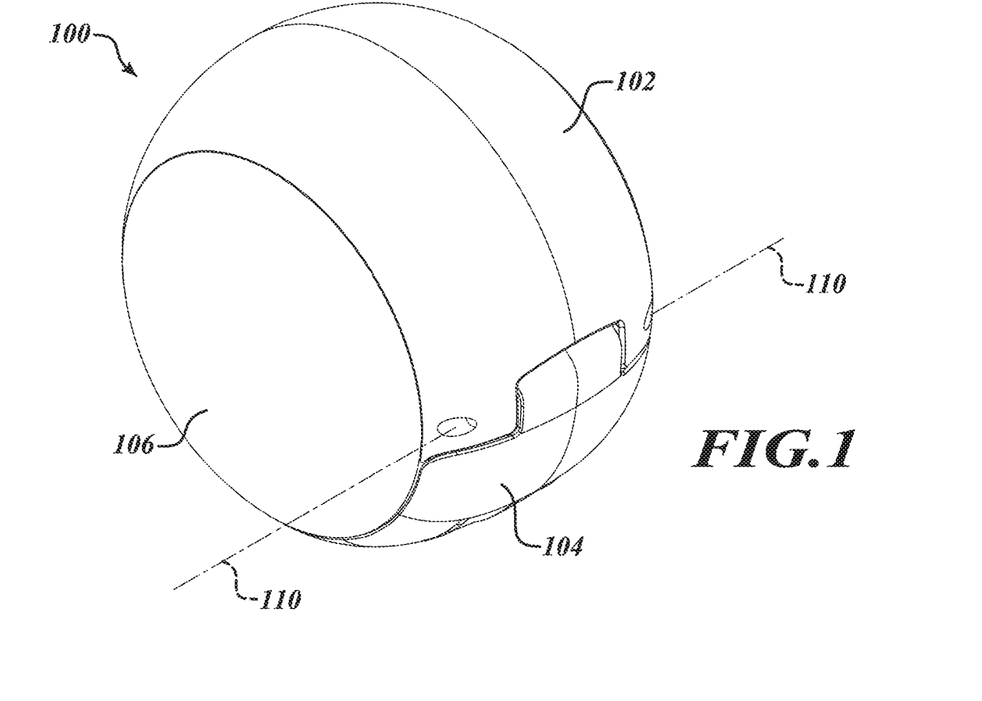
FIG. 1 illustrates a perspective view of a mincer, according to at least one illustrated implementation.
Figure 2:
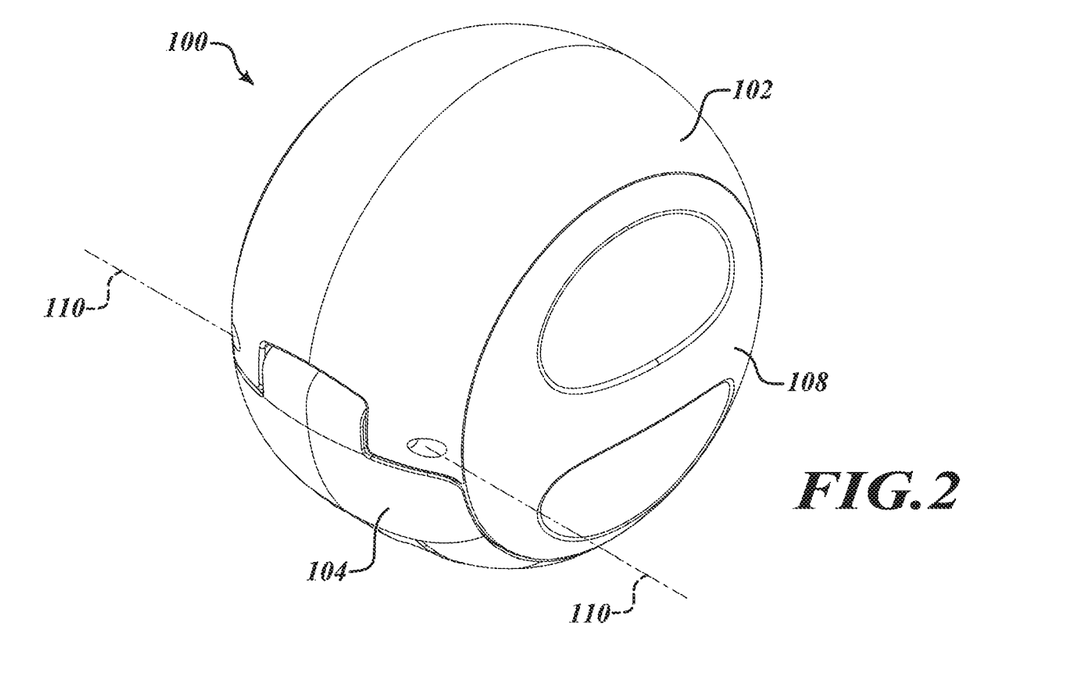
FIG. 2 illustrates another perspective view of the mincer of FIG. 1, according to at least one illustrated implementation.

FIG. 1 illustrates a perspective view of a mincer 100 in a first, closed configuration, in which the blades of the mincer 100 are completely retracted within a housing 102 of the mincer 100. FIG. 2 illustrates a different perspective view of the mincer 100 in the closed configuration. As illustrated in FIGS. 1 and 2, the mincer 100 includes several external components, including the housing 102, a door 104 that is coupled to the housing 102 by a hinge, a static side cap 106 that is coupled to the housing 102 by a snap-fit connection, and an actuator, which can be referred to as a knob or handle 108, which is rotatably coupled to the housing 102 by a snap-fit connection.

The mincer 100 is a hand-held device and is dimensioned such that it fits comfortably in a typical human hand. In use, the static side cap 106 is fixed and stationary with respect to the housing 102. The door 104 is rotatable with respect to the housing 102 about an axis 110 defined by its hinged connection to the housing 102. The handle 108 is rotatable with respect to the housing 102 such that the user can rotate the handle 108 in a first direction with respect to the housing 102 to extend the blades of the mincer 100, and in a second direction with respect to the housing 102, opposite the first direction, to retract the blades of the mincer 100 into the housing 102.

Figure 3:
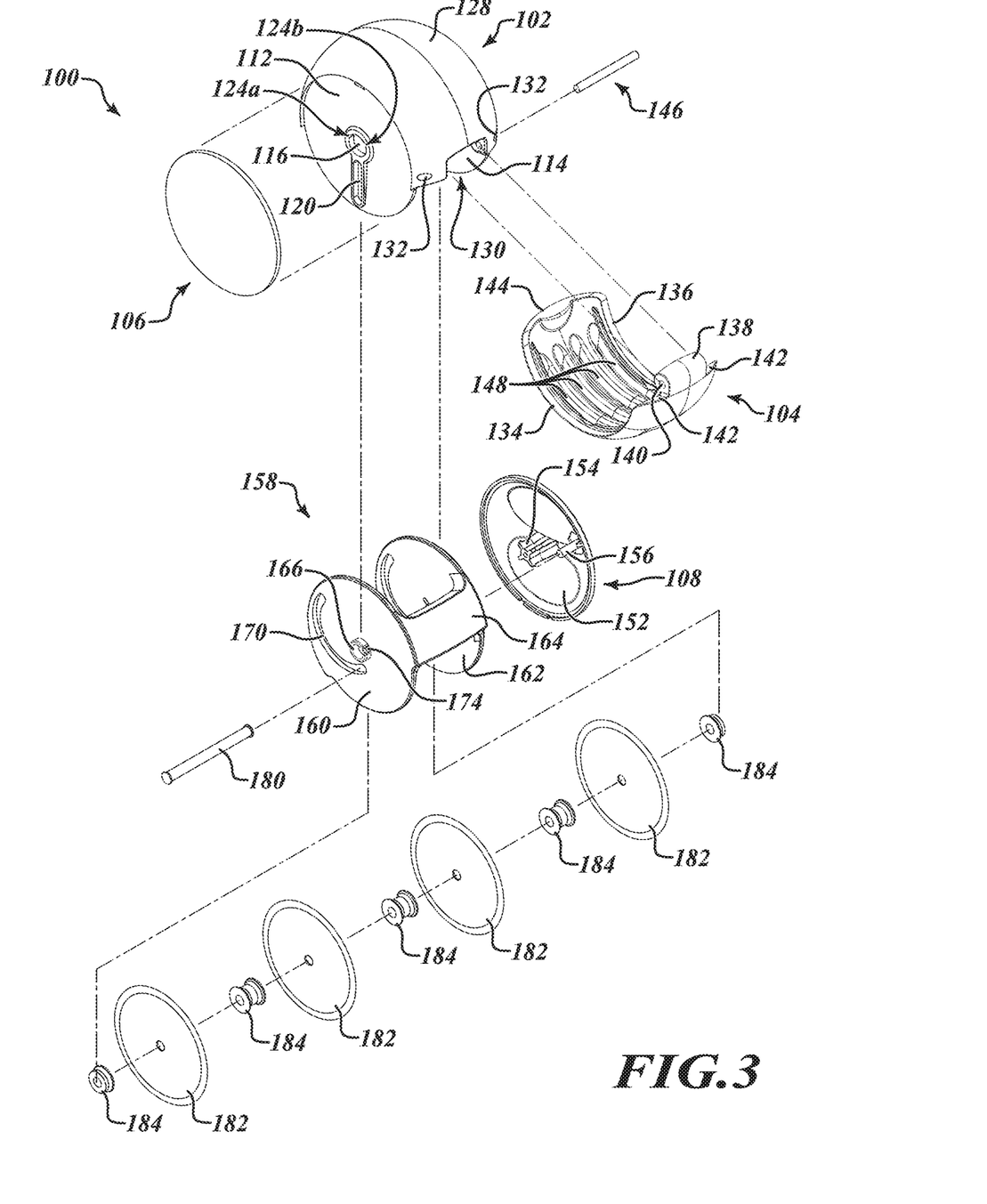
FIG. 3 illustrates an exploded view of the mincer of FIGS. 1 and 2 from a first perspective, according to at least one illustrated implementation.
Figure 4:
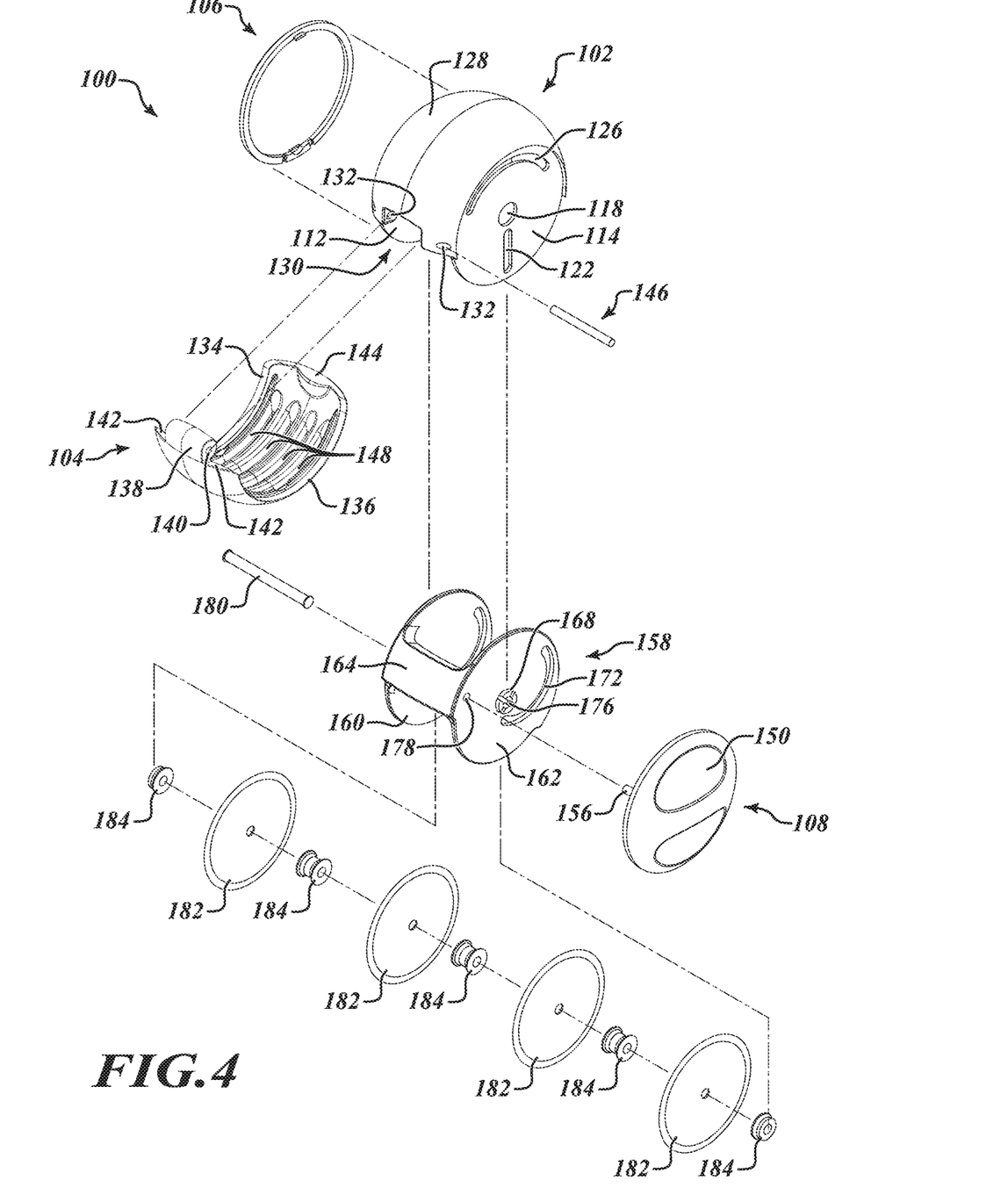
FIG. 4 illustrates another exploded view of the mincer of FIGS. 1 and 2 from a second perspective, according to at least one illustrated implementation.

FIGS. 3 and 4 illustrate each of the components of the mincer 100 in exploded views, from first and second perspectives, respectively. As illustrated in FIGS. 3 and 4, the housing 102 includes a first side plate 112 and a second side plate 114, each of the two side plates 112 and 114 having an overall shape comprising a cylindrical disc. The first disk-shaped side plate 112 includes a circular opening 116 at its center, which extends along a central longitudinal axis of the cylindrical disk shape of the side plate 112. The second disk-shaped side plate 114 includes a circular opening 118 at its center, which extends along a central longitudinal axis of the cylindrical disk shape of the side plate 114. The first side plate 112 also includes a slot 120 that extends through a thickness of the side plate 112 and radially with respect to the cylindrical disk shape of the side plate 112, from a first location proximate the opening 116 to a second location proximate an outer peripheral edge of the side plate 112. The second side plate 114 also includes a slot 122 that extends through a thickness of the side plate 114 and radially with respect to the cylindrical disk shape of the side plate 114, from a first location proximate the opening 118 to a second location proximate an outer peripheral edge of the side plate 114.

As illustrated in FIGS. 3 and 4, an outer peripheral edge of the first side plate 112 has the same dimensions as an outer peripheral edge of the second side plate 114 and the opening 116 and slot 120 in the first side plate 112 have the same dimensions as the opening 118 and slot 122 in the second side plate 114. Further, the first and second side plates 112, 114 are aligned with one another such that a central longitudinal axis of the first side plate 112 is coincident with a central longitudinal axis of the second side plate 114, such that the plates 112, 114 extend parallel to one another, and such that the opening 116 and slot 120 in the first side plate 112 are aligned with the opening 118 and slot 122 in the second side plate 114 when the housing 102 is viewed along the common central longitudinal axes of the side plates 112, 114.

As illustrated in FIG. 3, the opening 116 at the center of the first side plate 112 includes a pair of notches 124a and 124b that extend radially outward from the overall circular shape of the opening 116. The two notches 124a, 124b are located opposite the slot 120 with respect to the opening 116, and are positioned so they are symmetrical with respect to a central radial axis of the slot 120. The two notches 124a, 124b are separated from one another by 120° along the outer periphery of the circular opening 116. As illustrated in FIG. 4, the side plate 114 includes another slot 126, located proximate the outer peripheral edge of the plate 114, that extends through the thickness of the side plate 114 and circumferentially with respect to the cylindrical disk shape of the side plate 114, that is, at a constant distance from the opening 118 at the center of the plate 114 and at a constant distance from the outer peripheral edge of the plate 114. The slot 126 is located opposite the slot 122 with respect to the opening 118, and is symmetrical with respect to a central radial axis of the slot 122. The circumferential slot 126 extends along 120° about the opening 118.

As illustrated in FIGS. 3 and 4, the housing 102 also includes an outer shell 128 that couples the two side plates 112 and 114 to one another. The outer shell 128 has an overall shape that approximates one half (e.g., 180°) of a hollow cylindrical body, with one end of the outer shell 128 coupled a portion (e.g., about) 180° of the outer periphery of the side plate 112 and an opposite end of the outer shell 128 coupled a portion (e.g., about 180°) of the outer periphery of the side plate 114. The outer shell 128 includes a notch 130 extending into a side of the outer shell 128 that extends between the side plates 112, 114, as well as a pair of apertures 132 that share a common central longitudinal axis that extends through the notch 130, such that the apertures 132 and the portions of the outer shell 128 surrounding the apertures 132 form two knuckles for a hinged connection to the door 104.

As illustrated in FIGS. 3 and 4, the door 104 has an overall shape that approximates one half (e.g., 180°) of a hollow cylindrical body, with one end 134 of the door 104 configured to engage and mate with a portion (e.g., about 180°) of the outer periphery of the side plate 112 and an opposite end 136 of the door 104 configured to engage and mate with a portion (e.g., about 180°) of the outer periphery of the side plate 114. The door 104 includes four slots 148 that each extend circumferentially across a width of the door 104 in a direction aligned from a first side 142 of the door 104 to a second side 144 of the door 104 opposite to the first side 142 of the door 104. Each of the slots 148 is configured to allow a blade to extend therethrough, from within the housing 102 to outside of the mincer 100. The second side 144 of the door 104 is configured to engage with a side of the outer shell 128 opposite its notch 130 to close the housing 102.

The door 104 includes a protrusion 138 extending from the first side 142 of the door 104. The protrusion 138 includes an aperture 140 extending therethrough in a direction parallel to the apertures 132, such that the aperture 140 and the portion of the protrusion 138 surrounding the aperture 140 form a knuckle for a hinged connection to the housing 102. The protrusion 138 is configured to be positioned within the notch 130 to allow a dowel or pin 146 to pass through both of the apertures 132 and the aperture 140 to couple the knuckles of the housing 102 to the knuckle of the door 104, and the create a hinged connection between the housing 102 and the door 104.

As illustrated in FIGS. 3 and 4, the static side cap 106 includes a circular disk that can be clipped, snap-fit, or welded on to an external surface of the side plate 112 of the housing 102 to cover the opening 116, slot 120, and other internal components of the mincer 100. The handle 108 has an overall shape comprising a circular disk, and can be clipped or snap-fit on to an external surface of the side plate 114 of the housing 102 to cover the opening 118, slot 122, and other internal components of the mincer 100. The handle 108 includes an external surface 150 that is contoured to allow a user to easily grasp and manipulate the handle 108 with respect to the housing 102. The static side cap 106 and the handle 108 are aligned with one another and are aligned with the side plates 112 and 114 of the housing 102 such that a central longitudinal axis of the static side cap 106 is coincident with a central longitudinal axis of the handle 108, and coincident with the central longitudinal axes of the two side plates 112 and 114.

The handle 108 includes a cruciform-shaped post 154 extending longitudinally inward from a center of an inner surface 152 of the handle 108 facing toward the housing 102. The handle 108 also includes a cylindrical and circular-shaped post 156 extending longitudinally inward toward the housing 102 from a portion of the inner surface 152 of the handle 108 located proximate an outer peripheral edge of the inner surface of the handle 108. The radial location of the cylindrical post 156 with respect to a central longitudinal axis of the handle 108 matches the radial location of the circumferential slot 126 with respect to a central longitudinal axis of the side plate 114, such that the post 156 fits into and slides through the circumferential slot 126 when the mincer 100 is assembled and in use.

FIGS. 3 and 4 also illustrate that the mincer 100 includes a cam 158. The cam 158 includes a first cam plate 160, a second cam plate 162, and a bridge element 164 that rigidly couples the first cam plate 160 and the second cam plate 162 to one another. Each of the two cam plates 160 and 162 have an overall shape comprising a cylindrical disc. The first disk-shaped cam plate 160 includes a circular boss 166 at its center, which extends longitudinally outward toward the static side cap 106 along a central longitudinal axis of the cam plate 160 and, when the mincer 100 is in use, is seated within the opening 116 in the side plate 112 of the housing 102, to translationally lock the cam plate 160 with respect to the side plate 112 and allow the cam plate 160 to rotate with respect to the side plate 112. The second disk-shaped cam plate 162 includes a circular boss 168 at its center, which extends longitudinally outward toward the handle 108 along a central longitudinal axis of the cam plate 162 and, when the mincer 100 is in use, is seated within the opening 118 in the side plate 114 of the housing 102, to translationally lock the cam plate 162 with respect to the side plate 114 and allow the cam plate 162 to rotate with respect to the side plate 114.

The first cam plate 160 also includes a slot 170 that extends through a thickness of the cam plate 160 and along an arcuate and semi-circular path from a first location proximate the boss 166 to a second location proximate an outer peripheral edge of the cam plate 160. The second cam plate 162 also includes a slot 172 that extends through a thickness of the cam plate 162 and along an arcuate and semi-circular path from a first location proximate the boss 168 to a second location proximate an outer peripheral edge of the cam plate 162. The slots 170 and 172 extend along semi-circular paths, or paths that follow or that form 159.8° of a full circle between their respective first and second locations. The slots 170 and 172 extend along semi-circular paths that form a portion of a full circle having a center offset from the central longitudinal axis of the respective cam plate 160, 162 and of the respective side plate 112, 114.

An outer peripheral edge of the first cam plate 160 has the same dimensions as an outer peripheral edge of the second cam plate 162 and the boss 166 and slot 170 in the first cam plate 160 have the same dimensions as the boss 168 and slot 172 in the second cam plate 162. Further, the first and second cam plates 160, 162 are aligned with one another such that a central longitudinal axis of the first cam plate 160 is coincident with a central longitudinal axis of the second cam plate 162, such that the plates 160, 162 extend parallel to one another, and such that the boss 160 and slot 170 in the first cam plate 160 are aligned with the boss 162 and slot 172 in the second cam plate 162 when the cam plates 160, 162 are viewed along their common central longitudinal axes.

As illustrated in FIG. 3, the boss 166 at the center of the first cam plate 160 includes a ridge 174 that extends radially outward from the overall circular shape of the boss 166. The ridge 174 is positioned on the boss 166 to function as a detent by fitting into one of the notches 124a, 124b when the handle 108 reaches either end of its range of motion (i.e., by fitting into the notch 124a when a user turns the handle 108 all the way in a first direction to fully extend the blades 182 and by fitting into the notch 124b when the user turns the handle 108 all the way in a second direction opposite to the first direction to fully retract the blades 182). The ridge 174 therefore provides tactile feedback to the user by signaling that the handle 108 has reached the end of its range of travel when the ridge 174 engages one of the notches 124a, 124b, and by resisting initiation of movement of the handle 108 away from either end of its range of travel.

As illustrated in FIG. 4, the boss 168 at the center of the second cam plate 162 includes cruciform-shaped grooves 176 that face longitudinally outward from the cam plate 162 and toward the handle 108. The cruciform shape of the grooves 176 is complementary to the cruciform shape of the post 154 such that a distal end of the post 154 can be seated within the grooves 176 so that the handle 108 is rotationally locked about its central longitudinal axis with respect to the cam 158. FIG. 4 also illustrates that the cam plate 162 includes an opening 178 near an outer peripheral edge thereof. The radial location of the opening 178 with respect to a central longitudinal axis of the cam plate 162 matches the radial location of the cylindrical post 156 with respect to a central longitudinal axis of the handle 108 and the radial location of the circumferential slot 126 with respect to a central longitudinal axis of the side plate 114, such that the post 156 fits through the circumferential slot 126 and into the opening 178 so that the handle 108 is further rotationally locked about its central longitudinal axis with respect to the cam 158.

FIGS. 3 and 4 also illustrate that the mincer 100 includes a central pin or axle 180 and a plurality of blades 182 and a plurality of blade spacers or bushings 184 that are mounted to rotate freely on the axle 180 when the mincer 100 is assembled and in use. In particular, the mincer 100 includes four distinct blades 182 that are mounted to rotate independently on the axle 180 and five blade bushings 184 mounted between each adjacent pair of the blades 182 and at either end of the set of four blades 182. When the mincer 100 is assembled and in use, the blades 182 and blade bushings 184 are mounted to rotate freely and independently on the axle 180, and the blades 182 and blade bushings 184 alternate with one another along a length of the axle 180.

To assemble the mincer 100 from a completely disassembled state, the cam 158 is positioned within, e.g., snap-fit into, the housing 102 such that the boss 166 is positioned within the opening 116, the boss 168 is positioned within the opening 118, and the ridge 174 is positioned within the notch 124b, so that the cam 158 cannot translate with respect to the housing 102 but can rotate with respect to the housing 102 about the central longitudinal axes of the disk-shaped plates 112, 114, 160, and 162, which are coincident with one another, and so that the mincer is assembled to initially hold the blades 182 in the retracted configuration. Next, the axle 180 is extended through the slot 120 in the side plate 112, through the arcuate slot 170 in the cam plate 160, through the blades 182 and blade bushings 184, through the arcuate slot 172 in the cam plate 162, and through the slot 122 in the side plate 114, so that the blades are confined to rotate about the axle 180 and so that the axle 180 is confined to travel through the slots 120, 170, 172, and 122. Next, the static side cap 106 is clipped, snap-fit, or welded onto the housing 102 to cover internal components of the mincer 100. Further, the handle 108 is clipped or snap-fit onto the housing 102 to cover internal components of the mincer 100, such that the cylindrical post 158 extends through the slot 126 and into the opening 178, and such that the distal end portion of the cruciform post 154 is engaged with the cruciform-shaped grooves 176 of the boss 168, so that the handle 108 is rotationally locked to the cam 158. Next, the protrusion 138 of the door 104 is positioned within the notch 130 with the apertures 132 and 140 aligned with one another and the pin 146 is positioned through the apertures 132 and 140 to form a hinge between the housing 102 and the door 104. Finally, the door 104 is rotated about the hinge into a closed position in which the second side 144 of the door 104 is engaged with a side of the outer shell 128 opposite its notch 130 and the housing 102 is closed.

Figure 5:
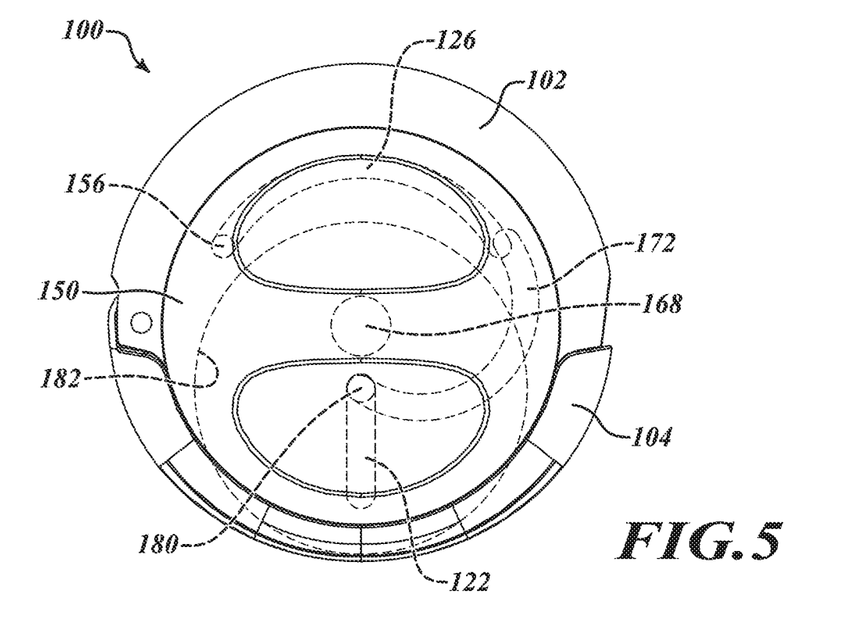
FIG. 5 illustrates a side view of the mincer of FIGS. 1 and 2 in a first configuration, with some internal features illustrated in dashed lines, according to at least one illustrated implementation.
Figure 6:
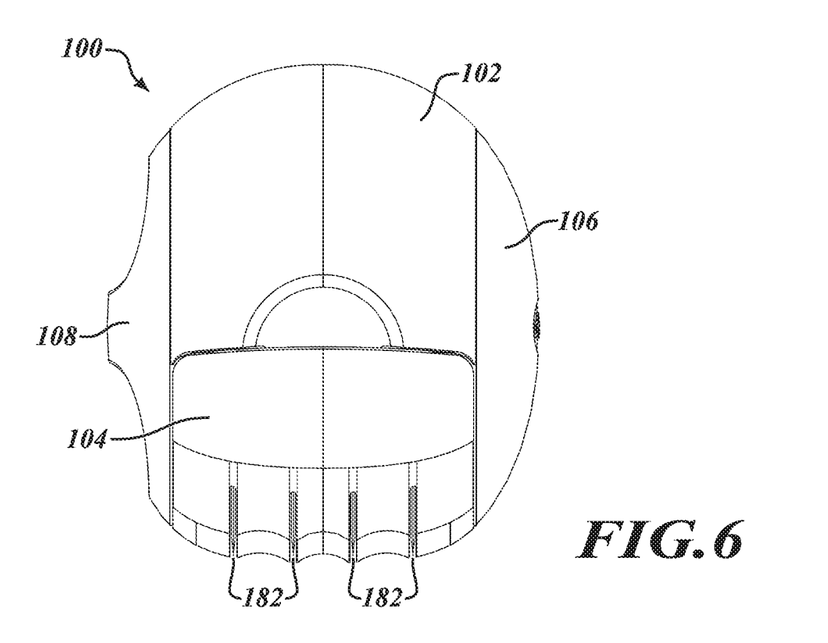
FIG. 6 illustrates an end view of the mincer of FIGS. 1 and 2 in the first configuration, according to at least one illustrated implementation.

FIGS. 5 and 6 illustrate the mincer 100 in its initial, fully assembled configuration, with its blades 182 fully retracted. Once the mincer 100 is fully assembled, a user can begin to operate the mincer 100 by holding the housing 102 in one hand, holding the handle 108 in the other hand, and rotating the handle 108 about its own central longitudinal axis with respect to the housing 102. In doing so, the user initially overcomes a resistance provided by the engagement of the ridge 174 with the notch 124b, which provides the user with tactile feedback indicating that rotation of the handle 108 with respect to the housing 102 has begun.

The engagement of the bosses 166, 168 of the cam 158 with the openings 116, 118 of the housing 102 restrains and allows the cam 158 to rotate about its own central longitudinal axis with respect to the housing 102. Thus, as the user turns the handle 108 with respect to the housing 102, the cylindrical post 156 travels through the slot 126 and the engagement of the cruciform-shaped post 154 with the cruciform-shaped grooves 176, as well as the engagement of the cylindrical post 156 with the opening 178, causes the cam 158 to turn about its own central longitudinal axis with respect to the housing 102, and therefore causes the arcuate slots 170, 172 to rotate about a central longitudinal axis of the cam 158 with respect to the radial slots 120, 122.

Figure 7:
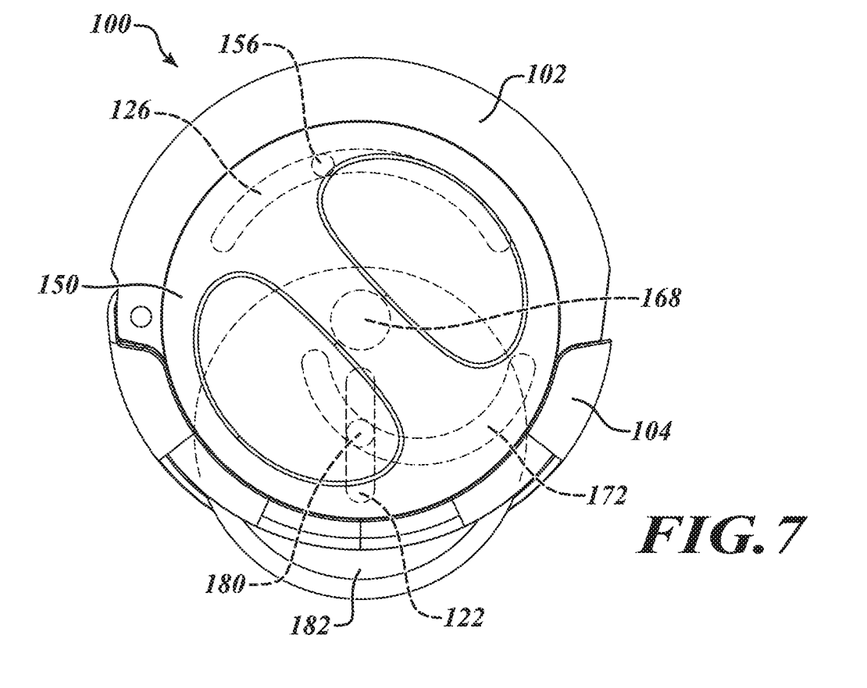
FIG. 7 illustrates a side view of the mincer of FIGS. 1 and 2 in a second configuration, with some internal features illustrated in dashed lines, according to at least one illustrated implementation.
Figure 8:
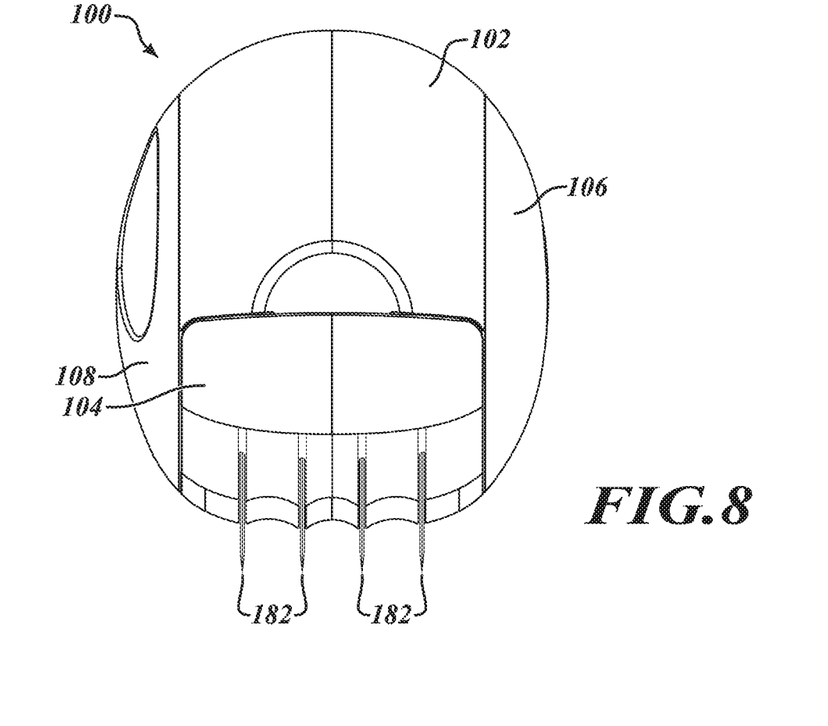
FIG. 8 illustrates an end view of the mincer of FIGS. 1 and 2 in the second configuration, according to at least one illustrated implementation.

Further, as the slots 170, 172 turn about the central longitudinal axis of the cam 158 with respect to the slots 120, 122, the engagement of the axle 180 within the slots 170, 172 of the cam 158, and within the slots 120, 122 of the housing 102, causes the axle 180 to move outward along the central radial axes of the slots 120, 122 with respect to the housing 102. In this sense, the cam 158, or the arcuate slots 170, 172 thereof, or the peripheral edges of the arcuate slots 170, 172, can act as a cam, and the axle 180 can act as a corresponding cam follower. As the axle 180 moves outward along the central radial axes of the slots 120, 122, the axle 180 carries the blades 182 with it, such that the blades 182 move from within the housing 102 to extend at least partially through the slots 148, as shown in the configuration illustrated in FIGS. 7 and 8.

Figure 9:
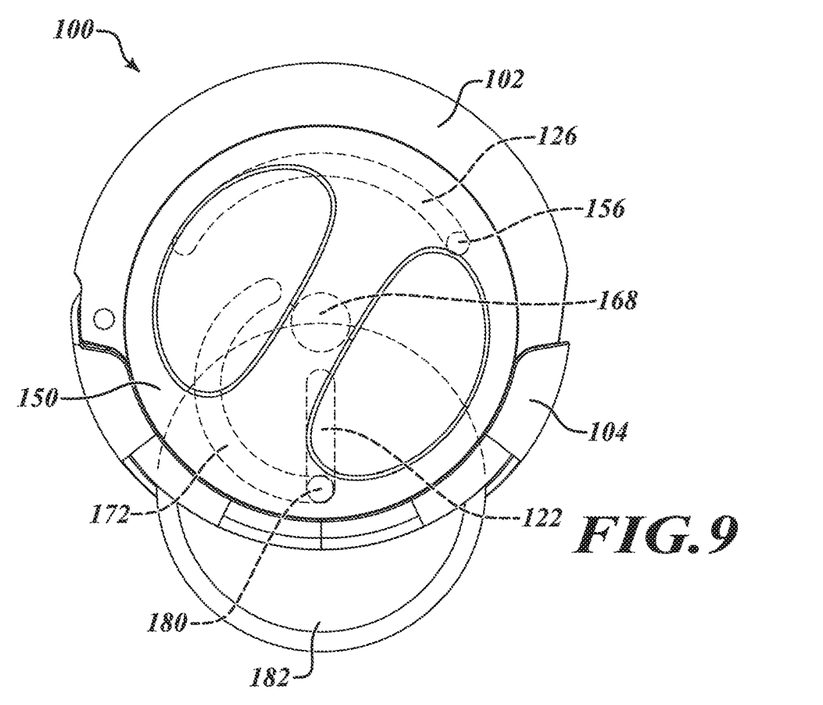
FIG. 9 illustrates a side view of the mincer of FIGS. 1 and 2 in a third configuration, with some internal features illustrated in dashed lines, according to at least one illustrated implementation.
Figure 10:
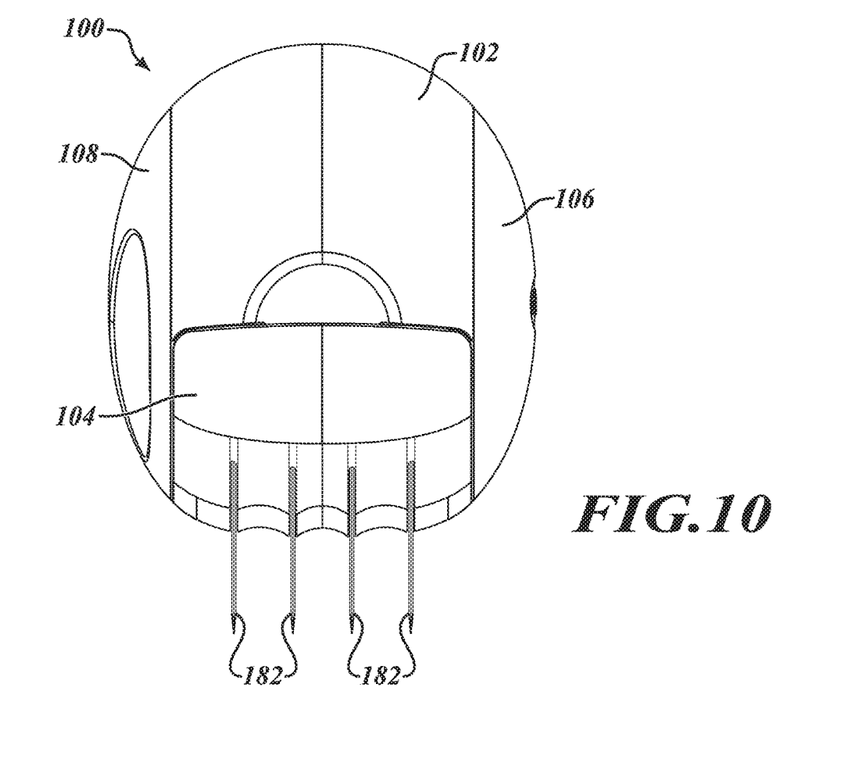
FIG. 10 illustrates an end view of the mincer of FIGS. 1 and 2 in the third configuration, according to at least one illustrated implementation.

The user can continue to turn the handle 108 with respect to the housing 102 until the handle 108 reaches the end of its range of travel. In doing so, the user eventually engages the ridge 174 with the notch 124a, such that the ridge 174 clicks into the notch 124a, which provides the user with tactile feedback indicating that rotation of the handle 108 with respect to the housing 102 has finished. As illustrated in FIGS. 9 and 10, the blades 182 at this point are fully extended. The user can then use the mincer 100 to mince items, such as edible items, such as herbs, vegetables, meats, etc. To mince items, the user can place the items on a hard surface such as a cutting board in a kitchen, hold the mincer 100 by the housing 102, and press the blades 182 into the hard surface. By moving the mincer 100 back and forth across the hard surface, the user can cause the blades 182 to rotate about the axle 180 and roll as they travel across the hard surface. The blades 182 can cut the items to be minced as they move back and forth across the hard surface, thereby mincing the items.

When the user has finished mincing, the user can retract the blades 182 back into the housing 102 by holding the housing 102 in one hand, holding the handle 108 in the other hand, and rotating the handle 108 about its own central longitudinal axis with respect to the housing 102 in a direction opposite to that used to extend the blades 182. In doing so, the user initially overcomes a resistance provided by the engagement of the ridge 174 with the notch 124a, and the retraction of the blades 182 proceeds essentially backward with respect to the description above for the extension of the blades 182.

Figure 11:
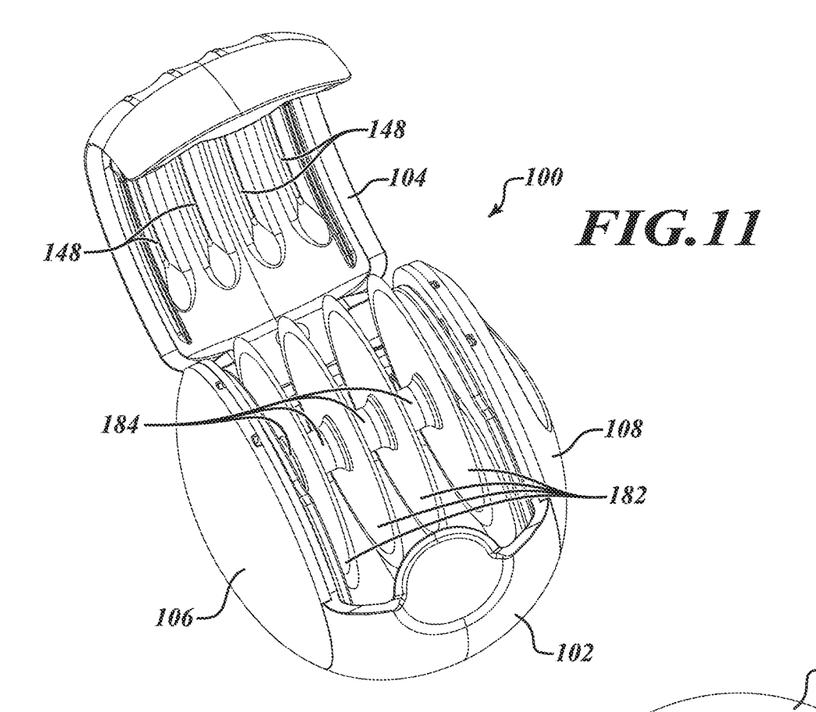
FIG. 11 illustrates a perspective view of the mincer of FIGS. 1 and 2 with a housing of the mincer open, according to at least one illustrated implementation.
Figure 12:
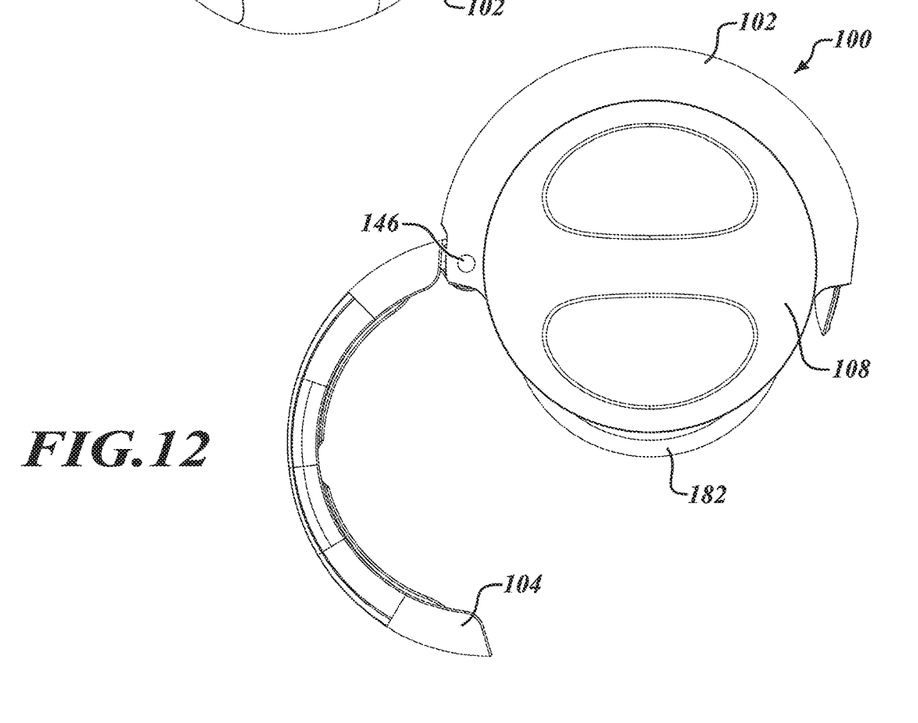
FIG. 12 illustrates a side view of the mincer of FIGS. 1 and 2 with a housing of the mincer open, according to at least one illustrated implementation.

To clean the mincer 100, or to replace a blade 182 or disassemble the mincer 100, the user can rotate the door 104 about its hinge with the housing 102, to open the mincer 100 and provide access to internal components thereof, as illustrated in FIGS. 11 and 12. Disassembly or partial disassembly of the mincer 100, whether for cleaning, repair, or replacement of parts, can proceed essentially backward with respect to the description above for the assembly of the mincer 100.

The features of the mincer 100 described herein, namely, the ability to use the camming action of the mincer 100 to extend and retract the blades 182 as needed, eliminates the need to provide the mincer 100 with an additional cap or cover that can be coupled to the housing 102 to enclose a portion of the blades 182 external to the housing 102 for safety when the mincer is not in use, such as during storage. Thus, the features of the mincer 100 described herein can reduce the complexity of the mincer 100, and reduce or eliminate the risk that the cover component is broken or lost.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

What is claimed is:

1. A mincer, comprising:
   a first disk shaped plate including a first linear slot that extends through a thickness of the first disk shaped plate and radially with respect to the first disk shaped plate;
   a first cam plate including a first arcuate slot that extends along a first arcuate path through the first cam plate;
   an axle that extends through the first linear slot and through the first arcuate slot such that rotation of the first cam plate with respect to the first disk shaped plate causes the axle to move through the first linear slot and linearly with respect to the first disk shaped plate; and
   a circular blade mounted on the axle.

2. The mincer of claim 1, wherein the first arcuate path of the first cam plate extends from a first location proximate a center of the first cam plate to a second location proximate an outer peripheral edge of the first cam plate.

3. The mincer of claim 1, wherein the first arcuate slot extends along the first arcuate path forming a portion of a circle.

4. The mincer of claim 3, wherein the circle has a center offset from a center of the second plate.

5. The mincer of claim 1, wherein the first disk shaped plate is a cylindrical.

6. A mincer, comprising:
   an outer shell having a substantially cylindrical shape with opposing sides spaced from and parallel to each other and a central axis, the outer shell having a rotatable handle positioned on one of said opposing sides, and at least one blade slot positioned in a curved portion of the outer shell;
   a cam configured to fit between said opposing sides of said outer shell and having opposing sides adjacent the opposing sides of the outer shell; and
   at least one circular blade rotatably mounted within the cam and aligned with the at least one blade slot, the at least one circular blade having an axis of rotation different than the central axis;

wherein rotation of the handle in one direction causes the at least one circular blade to be radially displaced relative to the central axis such that it extends outward through said at least one slot, and rotation of the handle in an opposite direction radially retracts the at least one circular blade into the at least one slot in the outer shell preventing exposure of the same when the mincer is not in use.

7. The mincer of claim 6, wherein said outer shell further comprises a curved door assembly hingedly connected to the curved portion, the at least one blade slot being positioned in the door assembly.

8. The mincer of claim 6, further comprising a mechanism integrated into the outer shell and the cam and configured to convert rotation motion of the rotatable handle into a linear radial displacement of the at least one circular blade with respect to the central axis of the outer shell.

9. The mincer of claim 8, wherein the mechanism comprises:

one of the opposing sides of the outer shell comprising a first plate including a first linear slot that extends linearly through the first plate;

one side of the cam adjacent the first plate of the outer shell comprising a second plate including a first arcuate slot that extends along a first arcuate path through the second plate, said second plate being in mechanical communication with the rotatable handle; and an axle positioned on the axis of rotation of the at least one blade and extending through the first linear slot and through the first arcuate slot such that rotation of the second plate with respect to the first plate causes the axle to move through the first linear slot and linearly with respect to the first plate.

10. The mincer of claim 9, further comprising:

the other of the opposing sides of the outer shell comprising a third plate including a second linear slot that extends linearly through the third plate, the third plate rigidly coupled to and aligned with the first plate; and the other of the sides of the cam comprising a fourth plate including a second arcuate slot that extends along a second arcuate path through the fourth plate, the fourth plate being rigidly coupled to and aligned with the second plate; wherein the axle extends through the second linear slot and through the second arcuate slot.

11. A mincer, comprising:

a first plate including a first linear slot that extends linearly through the first plate;

a first cam plate including a first arcuate slot that extends along a first arcuate path through the first cam plate;

a second plate including a second linear slot that extends linearly through the second plate, the second plate rigidly coupled to and aligned with the first plate; and a second cam plate including a second arcuate slot that extends along a second arcuate path through the second cam plate, the second cam plate rigidly coupled to and aligned with the first cam plate;

an axle that extends through the first linear slot, the first arcuate slot, the second linear slot and the second arcuate slot such that rotation of the first cam plate with respect to the first plate causes the axle to move through the first and second linear slot and linearly with respect to the first plate and second cam plate, respectively; and a circular blade mounted on the axle.

* * * * *